United States Patent [19]

Satoh et al.

[11] Patent Number: 4,872,606

[45] Date of Patent: Oct. 10, 1989

[54] SEALED STRUCTURE AND PRODUCTION METHOD THEREOF

[75] Inventors: Motohiro Satoh; Toshihiro Yamada; Akiomi Kohono; Akihiko Yamamoto; Keiji Taguchi, all of Ibaraki; Takahiro Daikoku, Ushiku; Fumiuki Kobayashi, Sagamihara, all of Japan

[73] Assignee: Hitachi, Ltd., Tokyo, Japan

[21] Appl. No.: 940,490

[22] Filed: Dec. 10, 1986

[30] Foreign Application Priority Data

Dec. 11, 1985 [JP] Japan ................................ 60-276784

[51] Int. Cl.⁴ .............................................. B23K 1/03
[52] U.S. Cl. .................................... 228/121; 228/124; 228/187; 228/194; 228/263.12
[58] Field of Search ............... 228/121, 122, 124, 194, 228/187, 263.12; 220/2.1 R, 2.3 R; 437/218; 174/52 FP

[56] References Cited

U.S. PATENT DOCUMENTS

| | | | |
|---|---|---|---|
| 3,517,432 | 6/1970 | Sandstrom | 228/121 |
| 3,693,239 | 9/1972 | Dix | 437/218 X |
| 3,994,430 | 11/1976 | Cusano et al. | 228/122 |
| 4,019,080 | 4/1977 | Besson | 228/122 X |
| 4,076,955 | 2/1978 | Gates | 174/52 FP |
| 4,602,731 | 7/1986 | Dockus | 228/122 X |
| 4,699,310 | 10/1987 | Kohno et al. | 228/122 |

FOREIGN PATENT DOCUMENTS

| | | | |
|---|---|---|---|
| 195067 | 10/1985 | Japan | 228/194 |
| 1063576 | 4/1986 | Japan | 228/122 |
| 1136969 | 6/1986 | Japan | 228/122 |
| 1082179 | 5/1960 | United Kingdom | 228/263.12 |

Primary Examiner—Kenneth J. Ramsey
Attorney, Agent, or Firm—Antonelli, Terry & Wands

[57] ABSTRACT

In a sealed structure consisting of ceramic members opposing each other and a frame coupled to the ceramic members and defining an He-tight chamber with the ceramic members, the melting point of a joint member for bonding one of the ceramic members to the frame is lower than the melting point of another joint member for bonding the other of the ceramic members to the frame so that rebonding can be made.

16 Claims, 3 Drawing Sheets

SEALED STRUCTURE AND PRODUCTION METHOD THEREOF

BACKGROUND OF THE INVENTION

1. Field of the Invention

This invention relates to a sealed structure consisting of a ceramic member and a frame that together form an air-tight chamber and to a method of producing the sealed structure. More particularly, the present invention relates to a sealed structure which is suitable when replacing an electronic component (an IC chip) or the like sealed in the sealed structure when it must be replaced for repairing, and to a production method of the sealed structure.

2. Description of the Prior Art

A known sealed structure for sealing therein an electronic component or the like is produced by solder-bonding a box member consisting of a ceramic member and having one of its surfaces open to a lid. However, when the heat generated by the electronic component or the like must be radiated outside, projections are formed inside the box member in such a manner as to come into contact with the electronic component, and the known sealed structure does not consider the necessity or workability when forming such projections. Incidentally, mention can be made of U.S. Pat. No. 3,993,123 as one of the prior art references of such a scaled structure.

Since it is difficult to shape and work the projections to the box member in accordance with the conventional technique, the projections are necessarily simple in shape. In other words, if the projections are molded integrally with the box member, work inside the box member is generally difficult because ceramic is difficult to work, and the projections are unavoidably simple in shape.

SUMMARY OF THE INVENTION

It is therefore an object of the present invention to provide a sealed structure which makes it easy to shape projections integrally with a ceramic member constituting the sealed structure and makes it possible to remove and bond once again the ceramic member so that an electronic component or the like to be sealed in the sealed structure can be replaced easily, and the invention is directed also to provide a production method of such a sealed structure.

In accordance with the present invention, the melting point of a joint member for bonding one of the ceramic members to a frame is lower than the melting point of another joint member for bonding the other of the ceramic members to the frame and the melting point of the frame itself.

In accordance with the present invention, an insert material prepared by laminating pure Al or an Al alloy as a core member and a metal having a lower melting point than that of the core member as skin members is inserted between one of the ceramic members and a frame, diffusion-bonding is then effected at a temperature at which only the skin members are fused, and the other of the ceramic members and the frame are solder-bonded by a material having a melting point lower than the melting point of the frame and that of pure aluminum or aluminum alloy.

Furthermore, in accordance with the present invention, one of the ceramic members opposing each other and one of the ends of the frame, and the other end of the frame and one of the ends of an intermediate member to be bonded to the other end of the frame are bonded by a joint member having a high melting point, respectively, and the other end of the intermediate member and the other of the ceramic members opposing each other are bonded by a joint member having a lower melting point than that of the joint member having a higher melting point.

According to the arrangement described above, desired heat radiating projections are formed on one of the ceramic members and the frame is then fitted and bonded to this ceramic member to constitute the sealed structure. Accordingly, work of the ceramic member can be made irrespective of the shape of the projections.

Moreover, the melting points of the joint members for bonding the frame and the ceramic members that oppose each other and are to be bonded to the frame are remarkably different. Therefore, if the joint portion is heated at a temperature at which the joint member having a lower melting point is fused, the frame and the other of the ceramic members can be separated from each other, and they can be bonded once again without affecting at all the joint portion bonded by the joint member having a higher melting point.

BRIEF DESCRIPTION OF THE DRAWINGS

FIGS. 1 through 8 are explanatory views that are useful for explaining a sealed structure and its production method in accordance with the present invention, wherein:

FIG. 1 is a sectional view of a sealed structure in accordance with one embodiment of the present invention;

FIG. 2 is a sectional view of a sealed structure in accordance with another embodiment of the invention;

FIG. 3 is a partial cut-away sectional view of a sealed structure in accordance with still another embodiment of the invention;

FIG. 4 is a sectional view of an intermediate member;

FIG. 5 is a sectional view of an intermediate member in accordance with another embodiment;

FIG. 6 is a partial cut-away sectional view of a sealed structure in accordance with still another embodiment of the invention; and FIGS. 7 and 8 are explanatory views when the present invention is applied to a semiconductor device.

DESCRIPTION OF THE PREFERRED EMBODIMENTS

Embodiment 1

Figure 1:
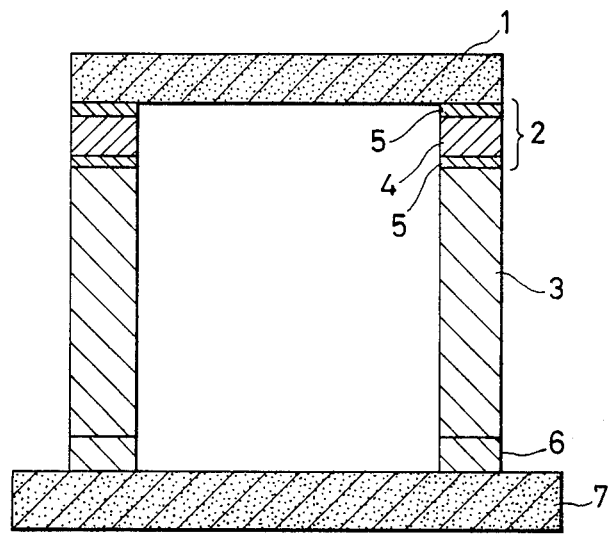

A ceramic (SiC) member (76 mm) 1 and a frame (WC - 6% Co) 3 were combined with each other through a joint member 2 having a high melting point (which will be hereinafter called the "high melting joint member") held at 600° C. in vacuum ($10^{-4}$ Torr) for 30 minutes and pressed at a pressure of 0.5 kg/mm$^2$, as shown in FIG. 1.

A clad material (0.60 mm thick) whose core member 4 was made of an Al-13% Mn alloy (0.48 mm thick) and whose skin members 5 were made of an Al-10% Si-2% Mg alloy (0.06 mm thick) was used as the high melting joint member 2. When the high melting joint member 2 was heated at 600° C., only both skin members 5 were fused, reacted with the ceramic member 1 and the frame 3 and caused diffusion bonding. On the other hand, the core member 4 was not fused. In addition, since the pressing force was low, too, its contraction in the pressing direction was extremely small.

Then, while the ceramic member 1 and the frame 3 were bonded, the assembly was bonded to a ceramic (Al$_2$O$_3$) member 7 subjected in advance to Ni metallizing treatment, by use of a low melting joint member (solder of a 60% Pb - 40% Sn alloy) 6, thereby forming a sealed structure. When a He leakage test of this sealed structure was conducted by a He leakage detector, the sealed structure was found to have excellent He-tightness at 10$^{-9}$ Torr l/s or below. When a temperature cycling test ($-55°$ C.$\sim 150°$ C., 1 hr cycle) was conducted, the sealed structure exhibited good He-tightness in cycles of 650 times, because no crack occurred in the compound layer formed at the interface of the joint portion. The reason why the crack did not develop was that the difference of thermal expansion coefficient was small between SiC of the ceramic member and WC-6% Co of the frame and the occurrence of thermal stress was less, too.

Incidentally, in joints having low He-tightness, net-like cracks could be observed throughout the compound layer at the joint portion.

It is possible to use W, Au, or the like in place of Ni when practising the metallizing treatment.

The ceramic member 7 could be removed easily by heating the joint portion bonded by the low melting joint member 6 to a temperature at which the solder was molten. The melting point of the solder was about 180° C. while the melting point of the Al-13% Mn alloy used for the core member 4 of the joint member 2 was 650° C. Accordingly, the ceramic member 7 could be removed by fusing only the solder without any adverse influences upon the diffusion bonding portion by the high melting joint member 2. When the ceramic member 7 was sealed once again, it could be joined easily once again at a low temperature without any adverse influences upon the diffusion bonding portion.

Embodiment 2

Figure 2:
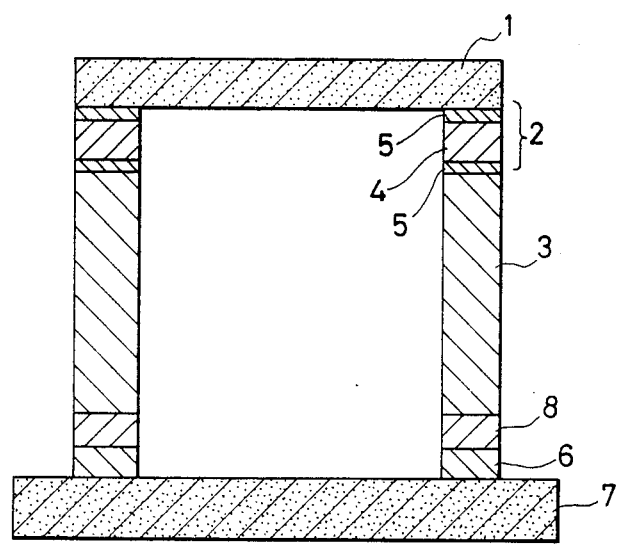

FIG. 2 shows another embodiment of the invention wherein an intermediate member (Fe-29% Ni-17% Co alloy) 8 was interposed when bonding the frame (WC-6% Co) 3 and the ceramic (Al$_2$O$_3$) member 7 by soldering. Namely, the assembly obtained by diffusion-bonding the joint member 3 and the intermediate member 8 was bonded to the ceramic member 1 and then the ceramic (Al$_2$O$_3$) member 7 was solder-bonded by use of the low melting joint member (60% Pb - 40% Sn alloy solder) 6. Diffusion bonding at the insert portion of the high melting joint member 2 and solder bonding after metallizing treatment of the ceramic member 7 were the same as those of Embodiment 1. Incidentally, it is possible to use an Fe-42% Ni alloy in place of Fe-29% Ni-17% Co alloy of the intermediate member 8.

Since the Fe—Ni alloy was first bonded to the frame and solder-bonding was then effected in this embodiment, wettability of the solder could be improved in this embodiment in addition to the effects obtained by Embodiment 1. Therefore, solder bonding became easier.

Embodiments 3-11

Figure 3:
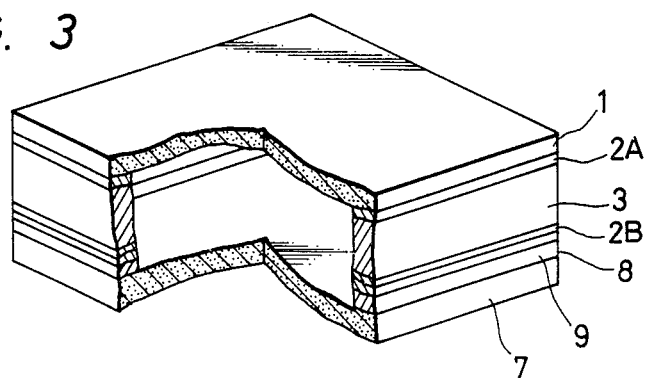

FIG. 3 is a partial cut-away sectional view of a sealed structure in accordance with the present invention. When an electronic component is fixed to one (7) of the opposed ceramic members 1 and 7, for example, the heat generated by the electronic component must be radiated outside from the sealed structure. Therefore, these embodiments used a ceramic member having high thermal conductivity as the ceramic member 1 and a ceramic member having electronic insulation as the ceramic member 7. More definitely, high thermal conductivity SiC, AlN, BeO, and the like, where used for the ceramic member 1 while Al$_2$O$_3$ and mullite were used for the ceramic member 7. Since He-tightness of the sealed structure must correspond to the temperature change, a material whose thermal expansion coefficient is equal, or approximate, to those of the ceramic members 1, 7 was selected for the frame 3. More definitely, cemented tungsten carbide alloys such as WC-6% Co and Wc-42% Ni were used. Their thermal expansion coefficients are extremely approximate to that of the ceramic as tabulated in Table 1.

TABLE 1

| No. | Material | | Thermal expansion coefficient |
| --- | --- | --- | --- |
| 1 | ceramics | SiC | 3.7 × 10$^{-6}$/°C. |
| 2 | | Al$_2$O$_3$ | 7 × 10$^{-6}$/°C. |
| 3 | | mullite | 5 × 10$^{-6}$/°C. |
| 4 | | sialon | 5 × 10$^{-6}$/°C. |
| 5 | | AlN | 4.4 × 10$^{-6}$/°C. |
| 6 | | BeO | 9.5 × 10$^{-6}$/°C. |
| 7 | cemented tungsten carbide alloys | WC-6% Co | 4.8 × 10$^{-6}$/°C. |
| 8 | | WC-42% Ni | 6.2 × 10$^{-6}$/°C. |

One of the ends of the ceramic member 1 was bonded to that of the frame 3 while the other end of the frame 3 was bonded to one of the ends of the intermediate member 8 by the high melting joint members 2A and 2B, respectively. More definitely, they were the same as the joint member 2 shown in FIG. 2. When the solder was used as the low melting joint member for the joint member 9, a material having good solder wettability was selected. More definitely, the core material 10 was made of stainless steel, the skin member 11A on the frame side was made of Ni and the skin member 11B on the side of the ceramic member 7 was made of Cu.

Figure 5:
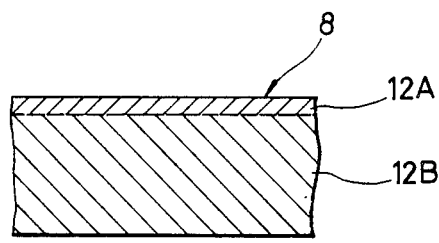

FIG. 5 shows another example of the intermediate member 8. The skin member 12A on the side of the frame 3 was made of an Al alloy, and the skin member 12B on the side of the ceramic member 7 was made of an Fe-42% Ni alloy. The high melting joint member and the lower melting joint member were selected relatively by comparing them with each other. The former may have a higher melting point than the latter by a temperature difference necessary for the work; hence, it does not mean an absolute temperature. In other words, the high melting point joint member may have a temperature difference such that the ceramic member 7 can be separated by heating at a low temperature at which the joint members 2A and 2B are not molten but only the joint member 9 is molten. When the temperature difference between the high melting joint member and the low melting joint member is small, the joint members 2A, 2B are molten, too, when the joint member 9 is molten. Accordingly, the joint members are selected so as to avoid such a problem.

He-tightness an be further improved by subjecting in advance the ceramic member 7 to metallizing treatment when bonding the intermediate member 8 to the ceramic member 7.

As described already, various ceramics can be used for the ceramic members 1, 7 and various cemented tungsten carbide alloys and ceramics can be used for the frame 3. They are altogether tabulated in Table 2. Examples No. 3 and 5 in Table 2 will be described in further detail.

Figure 4:
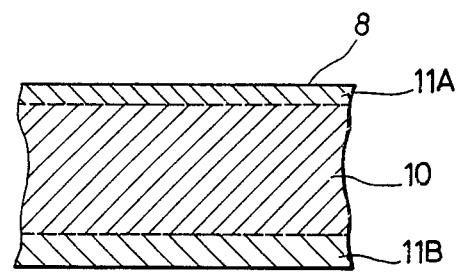

In Example No. 3, the same joint member as the joint member 2 shown in FIG. 2 was used for the joint members 2A and 2B for bonding the ceramic (SiC) member 1 (76×76×2 mm), the frame (WC-6% C) 3 and the intermediate member 8. The intermediate member 8 had the structure shown in FIG. 4. The core member 10 was made of stainless steel (0.228 mm thick), the skin member 11A was made of Ni (0.024 mm thick) and the skin member 11B was made of Cu (0.048 mm). The members 1, 3 and the intermediate member 8 were assembled, heated at 600° C. in vacuum ($10^{-4}$ Torr) and pressed and held at a pressure of 0.5 kg/mm$^2$ for 30 minutes. Since the skin member 5 was molten at 600° C., Al-10% Si-2% Mg reacted with SiC, WC-6% Co and Ni and caused diffusion bonding.

formed diffusion bonding. Thereafter, the ceramic member 7 subjected in advance to Ni and Au metallizing treatment was solder-bonded to produce the sealed structure. When the leakage test of this sealed structure was conducted in the same way as in Example No. 3, good He-tightness could be obtained. In a temperature cycling test of 500 times, too, the sealed structure could keep good He-tightness without causing any leakage.

Figure 7:
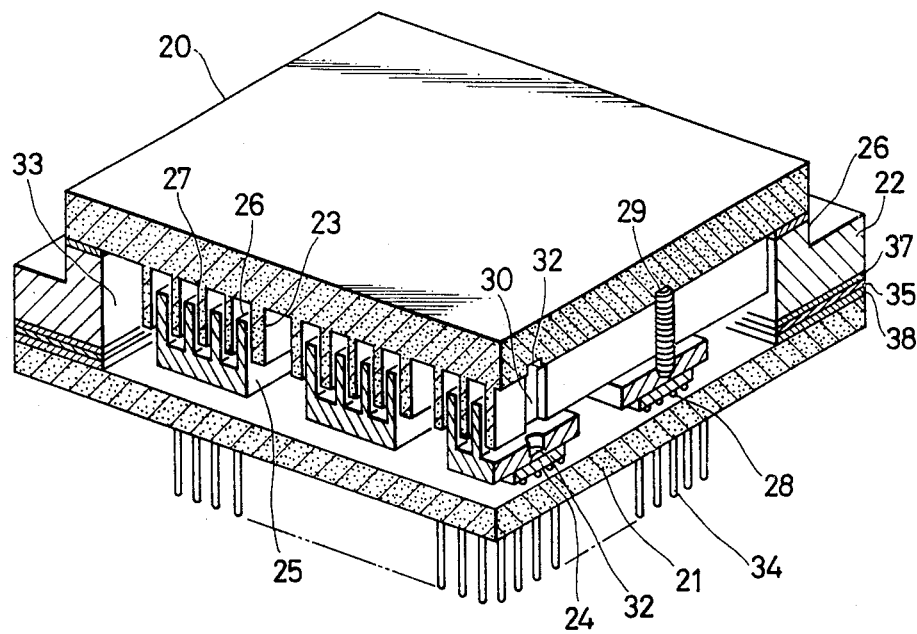
Figure 8:
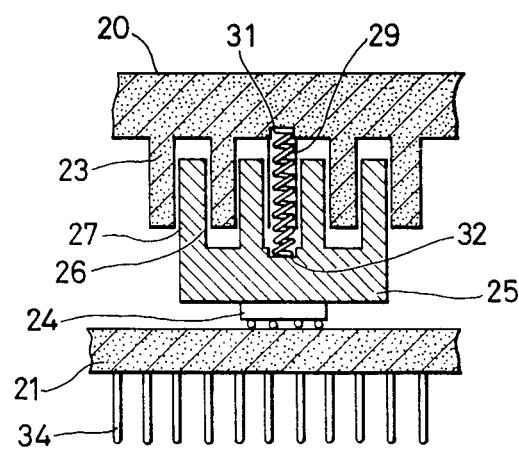

FIGS. 7 and 8 show an example when the present invention is applied to the production of the sealed structure of a semiconductor device. A ceramic member is used for both top plate and substrate. When working heat radiation fins on the top plate, the fins can be formed extremely easily because the production method which bonds the frame after the formation of the fins can be employed.

In other words, the frame (WC—Co) 22 was bonded to the top plate (high thermal conductivity SiC) 20 and

TABLE 2

| Example | Ceramic member 1 | Joint member 2, 2A | Frame 3 | Joint member 2B | Intermediate member 8 | Joint member 9 | Ceramic member 7 |
|---|---|---|---|---|---|---|---|
| 3 |  |  | .WC—Co |  | intermediate member A (FIG. 4) |  | .Al$_2$O$_3$ |
| 4 |  |  | .WC—Ni |  |  |  | .mullite |
| 5 | SiC | high melting joint member | .SiC .sialon | high melting joint member | intermediate member B (FIG. 5) | low melting joint member | .Al$_2$O$_3$ |
| 6 |  |  | .Al$_2$O$_3$ .AlN |  | intermediate member A (FIG. 4) |  |  |
| 7 |  |  |  |  |  |  |  |
| 8 |  |  |  |  |  |  |  |
| 9 |  |  |  |  |  |  |  |
| 10 | .AlN |  | .WC—Co |  |  |  |  |
| 11 | .BeO |  | .WC—Ni |  |  |  |  |

The core member 4 made of Al-13% Mn was not fused and since the pressing force was small as described already, contraction in the pressing direction was extremely small. After the ceramic member 1, the frame 3 and the intermediate member 8 where bonded, the ceramic member 7 made of Al$_2$O$_3$ and subjected in advance to metallizing treatment was bonded by solder (60% Pb-40% Sn) to produce a sealed structure. When a He leakage test of this sealed structure was conducted by a He leakage detector, He-tightness having a He leakage rate of $10^{-9}$ Torr or below could be obtained. When a temperature cycling test ($-55°\sim150°$ C., 1 hr cycle) of this sealed structure was conducted, good He-tightness could be obtained in 90 cycles.

When the joint portion 9 was heated to 180° C. so as to separate the ceramic member 7, it could be separated easily because only the solder was molten. It could be easily coupled once again by solder by the re-bonding method described already.

Figure 6:
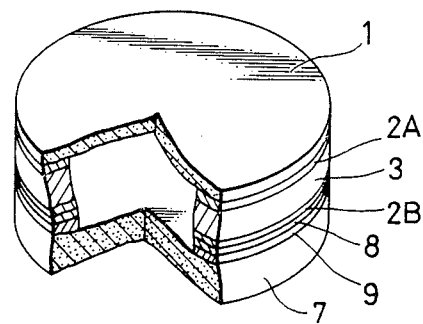

Next, Example No. 5 was directed to produce the sealed structure shown in FIG. 6. When bonding the ceramic member (SiC) ($\phi$50×2 mm) 1, the frame (WC-6% Co, innner diameter $\phi$46 mm, outer diameter $\phi$50 mm, height 6 mm) 3 and the intermediate member 8, this example used the same bonding members 2A, 2B as the bonding member 2 shown in FIG. 2 and the intermediate member 8 had the structure shown in FIG. 5. After these members were assembled, they were bonded by the same method as that of Example No. 3. In this example, too, Al-10% Si-2% Mn was fused, reacted with SiC, WC—Co and Al-13% Mn and the substrate (Al$_2$O$_3$) 21 to produce the sealed structure. A large number of plate-like fins 23 were formed in parallel with one another on the inner surface of the top plate 20 by integral molding. A large number of plate-like fins 26 were integrally formed on the base of a thermal conductor 25, too, which had a greater area than the heating surface area on the rear surface of an LSI (high integration density integrated circuit) chip 24 in the same pitch as that of the fins 23 described above. The fins 23 and the fins 26 were fitted to one another with very small spacing 27 between them. The base of the heat conductor 25 was pushed to the LSI chip 24 by a spring 29 having a small spring constant lest solder balls 28 for connecting the LSI chip 24 caused adverse influences, and came into surface contact with the back of the LSI chip 24. The spring 29 was inserted into the spacing 30 of the fins 23 and was fixed by a hole 31 bored on the top plate 20 and a hole 32 bored on the thermal conductor 25. A gas having a high thermal conductivity such as a He gas or H gas was packed into the sealed space 33 defined by the top plate 20, the substrate 21 and the frame 22. Pins 34 were disposed on the substrate 21 and electrically connected to the LSI chip 24.

In the semiconductor device having the construction described above, the heat radiated by the LSI chip 24 was transferred from the fins 26 of the heat conductor 25 to the fins 23 and emitted outside the semiconductor device from the top plate 20. Accordingly, the LSI chip could be cooled efficiently. The semiconductor device was produced in the following manner.

A blank sheet having a thickness equal to the sum of the height of the fins 23 and that of the top plate 20 was cut to shape the fins 23. Next, the shaped top plate 20, the frame 22 and the intermediate member 35 (having the structure shown in FIG. 4; core member, stainless steel, 0.028 mm thick; skin members, Ni, 0.024 mm thick; and Cu, 0.048 mm thick) were bonded at bond portions 36, 37 by use of a high melting joint member (having the same structure as that of the joint member 2 shown in FIG. 2; core material, Al-13% Mn, 0.48 mm thick; skin members, Al-10% Si-2% Mg, 0.06 mm thick). They were then assembled with the LSI chip 24, the heat conductor 25 and the spring 29 and the substrate 21 was bonded to the former at the joint portion 38 by using a solder (60% Pb-40% Sn) as the low melting joint member, thereby completing the semiconductor device.

When the substrate 21 must be separated after completion in order to replace the LSI chip 24, heating is made from outside the substrate 21 to a temperature at which the joint portion 38 can be heated to about 180° C. and the substrate 21 can be easily separated. It can be bonded once again easily after completion of replacement by the re-bonding method described already.

As described above, since the fins 23 can be worked while the frame 22 does not exist around them, the top plate 20 and the fins 23 can be integrally molded extremely easily, and the semiconductor device can be produced easily, too.

What is claimed is:

1. In a method of producing a sealed structure consisting of ceramic members opposing each other and a frame bonded with said ceramic members and forming an He-tight chamber with said ceramic members, the improvement comprising the steps of: inserting a high melting point insert member consisting of a core member made of pure aluminum or an aluminum alloy and skin members made of an aluminum alloy having a lower melting point than that of said core member, between one of said ceramic members and one side of said frame; heating said one ceramic member, said insert member and said frame in a vacuum to melt only said skin members to effect diffusion bonding; and solder-bonding the other of said ceramic members and the other side of said frame by a soldering material having a lower melting point than said high melting point insert member.

2. A method of producing a sealed structure comprising ceramic members opposing each other and a frame bonded with said ceramic members and forming an He-tight chamber with said ceramic members, the improvement comprising the steps of:
bonding an intermediate member to one side of said frame;
inserting a high melting point insert member consisting of a core member made of pure aluminum or an aluminum alloy and skin members made of an aluminum alloy having a lower melting point than that of said core member, between one of said ceramic members and the other side of said frame; heating said one ceramic member, said insert member and said frame in a vacuum to melt only said skin members to effect diffusion bonding; and solder-bonding the other of said ceramic members and said intermediate member by a soldering material having a lower melting point than said high melting point insert member.

3. The method of producing a sealed structure according to claim 2 wherein said skin members consist of a mixture of Al—Si—Mg alloy powder and a binder in paste form which is coated on the surface of one or both of said ceramic members and said frame, and diffusion-bonding is then made at a temperature at which said Al—Si—Mg alloy is molten.

4. A method of producing a sealed structure according to claim 2, wherein said intermediate member consists of an Fe—Ni—Co alloy and is bonded to said frame by diffusion bonding.

5. The method of producing a sealed structure according to claim 2, wherein said intermediate member consists of an Fe—Ni alloy and is bonded to said frame by diffusion bonding.

6. The method of producing a sealed structure according to claim 1, wherein an electronic component sealed within said sealed structure may be repaired or replaced by the further steps of:
heating said sealed structure to a temperature sufficient to melt said material having a lower melting point;
removing the other of said ceramic members from said framed;
repairing or replacing said electronic component; and
resolder-bonding the other of said ceramic members and said frame by a material having a lower melting point than said frame, said pure Al or said Al alloy.

7. In a method of producing a sealed structure comprising ceramic members opposing each other and a frame bonded with said ceramic members and forming an He-tight chamber with said ceramic members, the improvement comprising the steps of: bonding in a vacuum one of the ends of one of said ceramic members to one of the ends of said frame and the other end of said frame to one of the ends of an intermediate member to be bonded to said frame, by use of joint members having a high melting point; and bonding the other end of said intermediate member and the other of said ceramic members by a joint member having a melting point lower than said joint member having a high melting point.

8. The method of producing a sealed structure according to claim 7, wherein said joint member having a high melting point consists of a core member made of pure Al or an Al alloy and skin members made of an Al—Si alloy, said joint member having a low melting point is a solder, one of said ceramic members is made of SiC, the other of said ceramic members is made of $Al_2O_3$ or mullite, said frame is made of a cemented tungsten carbide alloy, a core material of said intermediate member is made of a stainless steel, a skin member of said intermediate member on the side of said frame is made of Ni and a skin member of said intermediate member on the side of the other of said ceramic members is made of Cu.

9. The method of producing a sealed structure according to claim 8 wherein cemented tungsten carbide alloy is a WC—Co—alloy or a WC—Ni alloy.

10. A method of producing a sealed structure comprising ceramic members opposing each other in a frame bonded with said ceramic members and forming an He-tight chamber with said ceramic members, the improvement comprising the steps of:

bonding in a vacuum one of the ends of one of said ceramic members to one of the ends of said frame and the other end of said frame to one of the ends of an intermediate member to be bonded to said frame, by use of a joint member having a high melting point; and bonding the other end of said intermediate member and the other of said ceramic members by a joint member having a melting point lower than said joint member having a high melting point, wherein a core member of said joint member having a high melting point is made of pure Al or an Al alloy, and skin members of said joint member having a high melting point are made of an Al—Si alloy, said joint member having a low melting point is a solder, one of said ceramic members is SiC, the other of said ceramic members is $Al_2O_3$ or mullite, said frame is made of a cemented tungsten carbide alloy, a skin member of said intermediate member on the side of said frame is made of an Al alloy and a skin member of said intermediate member on the side of the other of said ceramic members is made of an Fe—Ni alloy.

11. The method of producing a sealed structure according to claim 10 wherein said cemented tungsten carbide alloy is a WC—Co alloy or a WC—Ni alloy.

12. The method of producing a sealed structure according to claim 7, wherein a core member of said joint member having a high melting point is made of pure Al or an Al alloy, and skin members of said joint member having a high melting point are made of an Al—Si alloy, said joint member having a low melting point as a solder, one of said ceramic members is SiC, the other of said ceramic members is $Al_2O_3$ or mullite, said frame is made of a ceramic, a core member of said intermediate member is made of a stainless steel, a skin member of said intermediate member on the side of said frame is made of Ni and a skin member of said intermediate member on the side of the other of said ceramic members is made of Cu.

13. The method of producing a sealed structure according to claim 12 wherein said ceramic member of said frame is SiC, sialon, $Al_2O_3$ or AlN.

14. The method of producing a sealed structure according to claim 7, wherein a core member of said joint member having a high melting point is made of pure Al or an Al alloy, and skin members of said joint member having a high melting point is made of an Al—Si alloy, said joint member having a low melting point is a solder, one of said ceramic members is made of AlN or BeO, the other of said ceramic members is made of $Al_2O_3$, said frame is made of a cemented tungsten carbide alloy, a core member of said intermediate member is made of a stainless steel, a skin member of said intermediate member on the side of said frame is made of Ni, and a skin member of said intermediate member on the side of the other of said ceramic members is made of Cu.

15. The method of producing a sealed structure according to claim 14 wherein said cemented tungsten carbide alloy is a WC—Co alloy or a WC—Ni alloy.

16. The method of producing a sealed structure according to claim 7, wherein an electronic component sealed within said sealed structure may be repaired or replaced by the further steps of:
heating said sealed structure to a temperature sufficient to melt said joint member having a lower melting point;
removing the other of said ceramic members from said frame;
repairing or replacing said electronic component; and
rebonding the other end of said intermediate member and the other of said ceramic members by a joint member having a melting point lower than said joint member having a high melting point.

* * * * *